May 19, 1959  J. MÜLLER  2,887,310
WHEEL SUSPENSION OF VEHICLES
Original Filed July 5, 1952  3 Sheets-Sheet 1
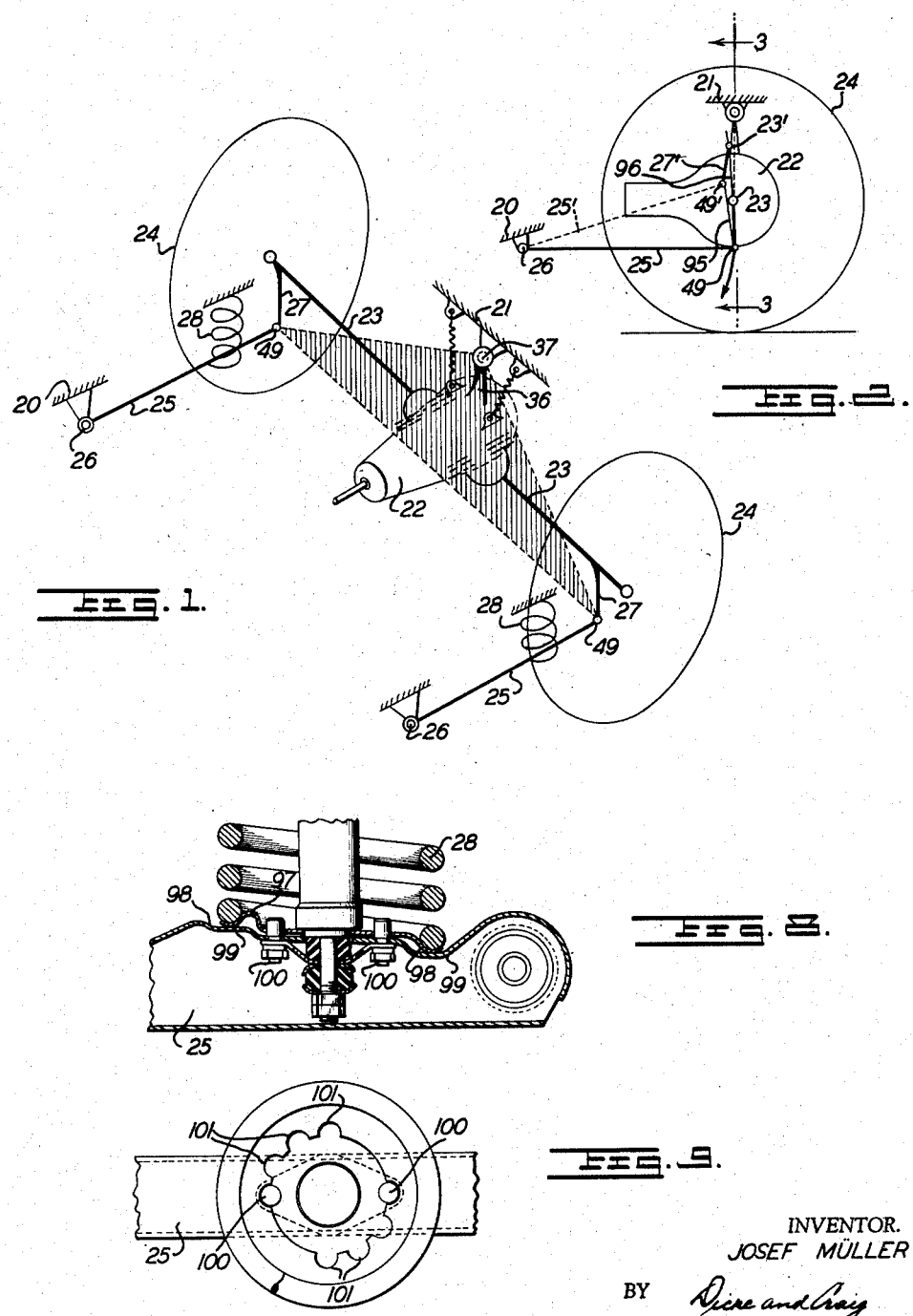
INVENTOR.
JOSEF MÜLLER
BY *Dике and Craig*
ATTORNEYS

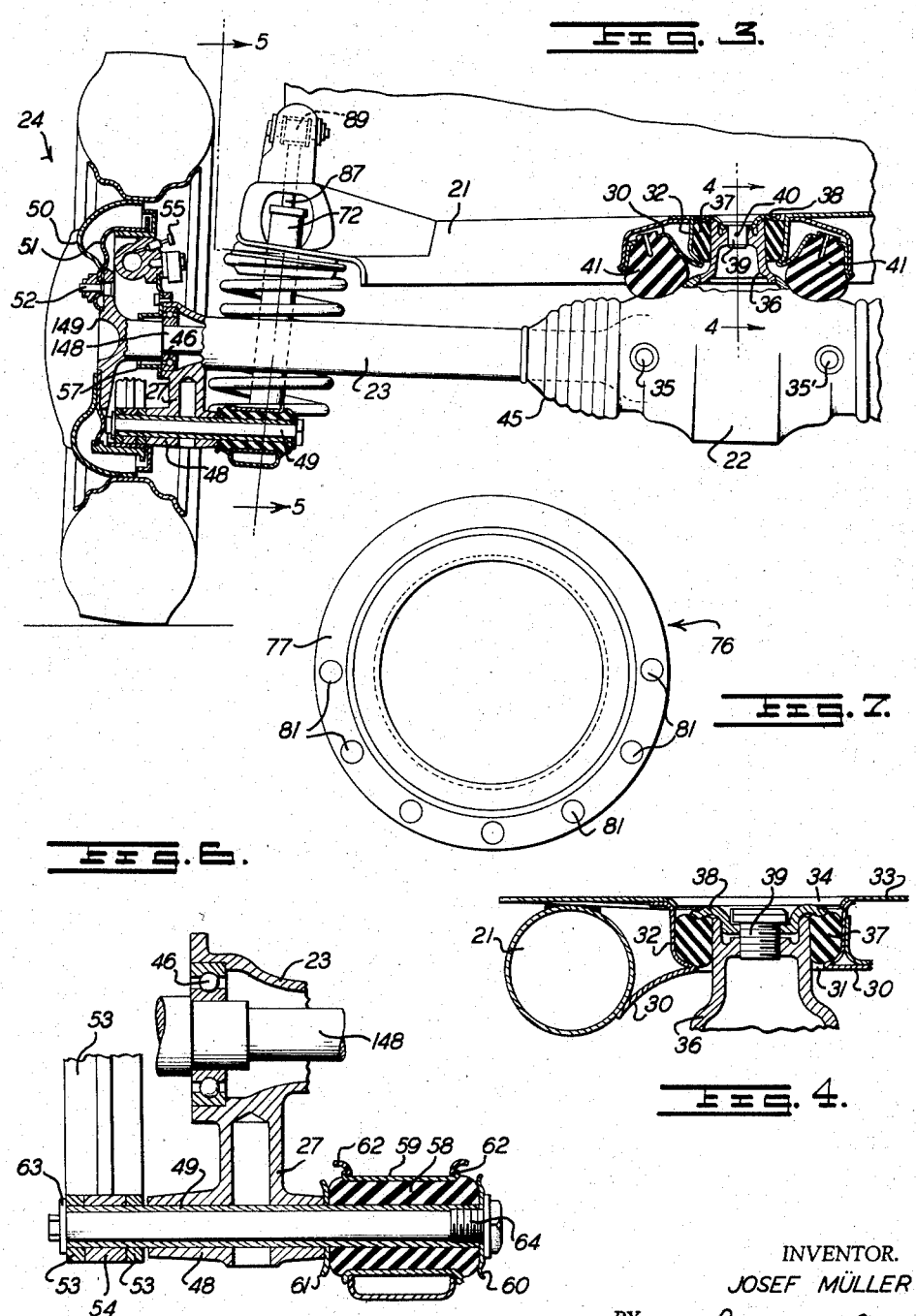

May 19, 1959     J. MÜLLER     2,887,310
WHEEL SUSPENSION OF VEHICLES
Original Filed July 5, 1952     3 Sheets—Sheet 3
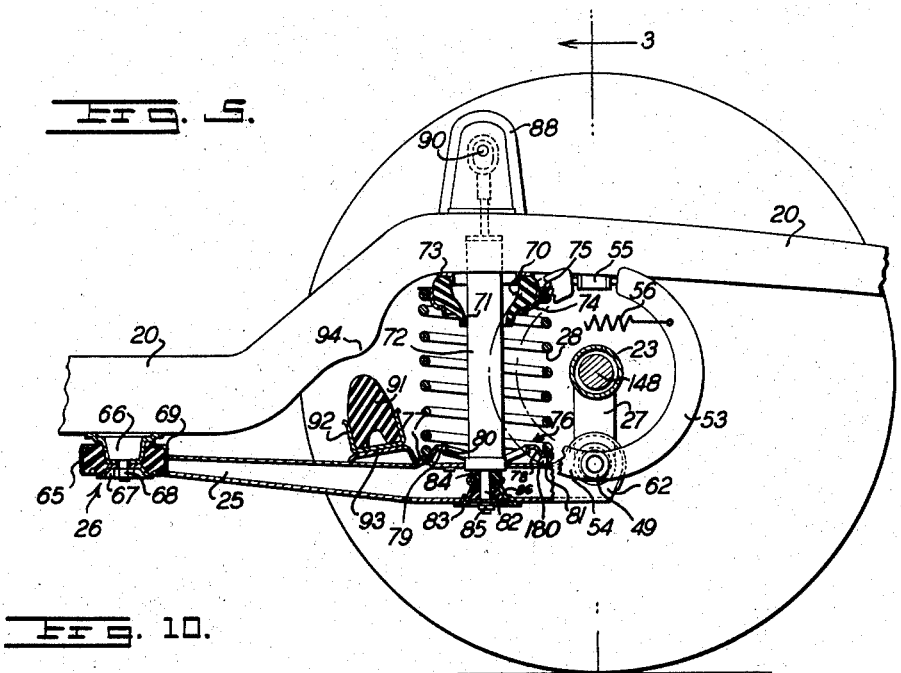
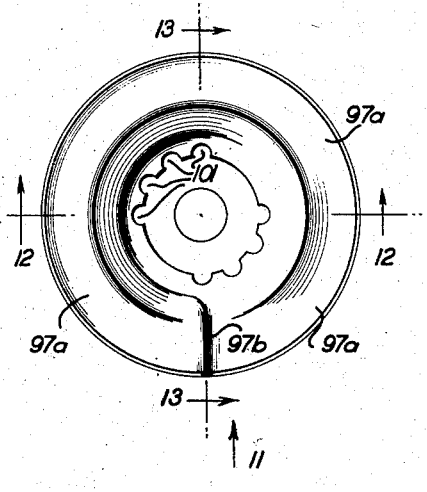
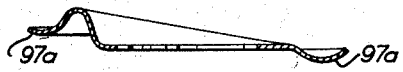
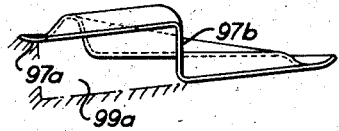
INVENTOR.
JOSEF MÜLLER
BY *Dicke and Dicke*
ATTORNEYS United States Patent Office 2,887,310
Patented May 19, 1959

2,887,310
WHEEL SUSPENSION OF VEHICLES

Josef Müller, Stuttgart, Germany, assignor to Daimler-Benz Aktiengesellschaft, Stuttgart, Unterturkheim, Germany Original application July 5, 1952, Serial No. 298,245. Divided and this application July 15, 1955, Serial No. 524,830

Claims priority, application Germany July 9, 1951

10 Claims. (Cl. 267—20)

The present application is a divisional application of my copending application Serial No. 298,245, filed on July 5, 1952, now Patent No. 2,806,713, and entitled "Wheel Suspension of Vehicles."

My invention relates to the wheel suspension of vehicles and is particularly applicable to motor vehicles of the type in which the wheels are journalled on half-axles hinged for up and down motion to the axle transmission housing or a suitable bracket member fixed to the vehicle body. It is the object of my invention to provide improved means for so bracing the half-axles against the body as to relieve the hinges from thrust acting on the half-axles lengthwise of the vehicle without, however, shifting the half-axles to any substantial extent out of registry with a vertical transverse plane of the vehicle.

Further objects of my invention are to provide improved means for taking up the braking couple acting on the axle member: to provide a wheel suspension in which helical springs supporting the vehicle body on wheel guiding elements are disposed at a low level in front of the rear half-axles; to provide improved spring-adjusting means for helical springs, and to reduce the transfer of noise from the wheels to the body of the vehicle.

Further objects of my invention will appear from a detailed description of a number of embodiments thereof. It is to be understood, however, that such detailed description serves the purpose of explanation rather than limitation of the invention.

In the drawings:

Fig. 1 is a perspective diagrammatic view of my novel rear wheel suspension of a motor vehicle, the body proper being omitted.

Fig. 2 is a diagrammatic side view of a rear wheel suspended by my novel means, illustrating the movement performed by the various elements.

Fig. 3 is a partial rear view of the wheel suspension of the motor vehicle, partially shown in section taken along the line 3—3 of Figs. 2 and 5.

Fig. 4 is a partial section of the means for attaching the axle transmission housing to the vehicle body, the section being taken along line 4—4 of Fig. 3.

Fig. 5 is a sectional view of the wheel suspension, the section being taken substantially along the broken line 5—5 of Fig. 3.

Fig. 6 is a detail illustrated in Fig. 3 shown on an enlarged scale.

Fig. 7 is a plan view of a spring seating member shown in section in Fig. 5.

Fig. 8 is a view similar to that of Fig. 5 of a modified spring adjusting arrangement.

Fig. 9 is a plan view of a sheet metal fixture shown in section in Fig. 8.

Figure 10 is a top plan view, on an enlarged scale, showing the details of the sheet metal fixture 97 of Figure 8.

Figure 11 is an elevational view of Figure 10 taken in the direction of arrow 11 of Figure 10.

Figure 12 is a cross sectional view taken along line 12—12 of Figure 10, and

Figure 13 is a cross sectional view taken along line 13—13 of Figure 10.

The wheel body which may or may not include a detachable chassis is but diagrammatically represented as comprising longitudinal lateral hollow sheet metal beams 20 and a tubular transverse beam 21 connected therewith. A bracket member formed, for example, by the axle housing 22 is attached to the vehicle body for a restrained universal rocking motion by resilient means to be later described in detail. A pair of half-axles 23 are hinged to the bracket member 22 for up and down rocking motion and extend laterally therefrom. Wheels 24 are journalled on the free ends of the half-axle 23. The latter are braced against thrusts acting longitudinally of the vehicle by links 25 extending lengthwise of the vehicle. The forward end of each link 25 is pivotally connected to the vehicle body at a point generally designated in Figs. 1 and 5 by the numeral 26 and its rear end is pivotally connected to a depending arm or projection 27 integral with the half-axle 23. The body rests on a pair of helical springs 28, which are supported by the links 25 and are disposed in front of the half-axles. My invention is shown in Figs. 1 to 6 as applied to the driven wheels of a vehicle, the bracket member of which is formed by the axle transmission housing 22.

While the foregoing gives a general outline of my novel wheel suspension, the same will now be described in detail.

As shown in Figs. 3 and 4 a sheet metal member 30 which is welded to the hollow beam 21 extends rearwardly therefrom and is provided with an aperture 31. An annular sheet metal member 32 is welded to the edge of aperture 31 extending upwardly therefrom and having an upper outer flange welded to a flat sheet metal piece 33 provided with an aperture 34 located above and registering with the aperture 31. The member 32 has a lower inner flange. The piece 33 is welded to beam 21.

The bracket member constituted by axle transmission housing 22 is provided with an upstanding stud 36 which projects into the member 32 through the aperture 31 but is spaced from the edge thereof. Its upper end is surrounded by a ring shaped rubber cushion or rubber pad 37 which is located inside the annular sheet metal member 32 resting on the lower inner flange thereof. A washer 38 fixed to the stud 36 by a threaded bolt 39 projects outwardly therefrom and rests on the top face of the rubber pad 37 but is spaced from the sheet metal member 32.

Owing to this arrangement, the housing 22 is at liberty to perform a universal rocking motion about the center of the rubber cushion 37, said center being indicated in Fig. 3 at 40. The rocking motion will be counter-acted, of course, by the elastic forces exerted by the deformed annular pad 37 upon the stud 36 and the washer 38 and will thus be restrained to a certain extent.

It is desirable, however, that the rocking motion of the axle transmission housing 22 be restrained to a greater extent in a lateral direction with respect to the vehicle than in the fore-and-aft direction. For that purpose I have provided additional resilient means in form of a pair of rubber cushions 41 (Figure 3) which are so mounted on either side of stud 36 as to counteract lateral oscillations of housing 22 without, however, substantially interfering with fore-and-aft oscillations thereof.

When the cushions 41 are in relieved condition, they have the shape of a tapered body of revolution.

Each cushion 41 is seated in an inverted cupshaped depression formed in the sheet metal member 30 and projects downwardly therefrom into contact with the housing 22. Normally each cushion is deformed so as to adopt the shape of a pear as shown in full lines in Fig. 3. However, it may be further deformed. In this manner the cushion will exert upon housing 22 a restoring force which increases progressively with increasing deformation. The bottom of the cupshaped depression of sheet metal member 30 may be provided with a hole for projection therethrough of a detent portion of the cushion which is so shaped as to hold the cushion in place upon disassembly of the housing 22.

The resilient means for mounting the housing 22 to the vehicle body comprising the annular pad 37 and the cushions 41 do not only permit a universal rocking motion of the housing, but will also act as a cushion in vertical direction minimizing the transfer of noise and vibration from the housing 22 to the body of the vehicle. While the annular pad 37 acts as a spring restraining downward motion of housing 22 relative to the body, the rubber cushions 41 will act as springs restraining upward motion of the housing 22 relative to the body.

Each half-axle 23 is formed by a tubular member, the inner flaring end of which extends into housing 22 through a lateral aperture thereof and is hinged therein by a pair of trunnions 35 and 35', the rear trunnion being visible in Fig. 3. The axes of the two hinges of the pair of half-axles 23 extend parallel to one another and horizontally, when the stud 36 of the housing 22 assumes its vertical position shown in Fig. 4. A bellows 45 (Figure 3) fixed to the housing 22 and the half-axle 23 serves to seal the gap therebetween.

The flaring free end of the half-axle 23 accommodates an internal ball-bearing 46 (Figure 6) and is integral with the depending arm 27 provided with a sleeve shaped head 48 in which a hollow pin 49 is mounted so as to project on either side therefrom.

The axes of the pins 49 extend parallel to the half-axles 23 in a common plane therewith, which intersects the axes of the hinges 35 at right angles and includes the axis of stud 36. This is true irrespective of the up-and-down movement of the half-axles. Such common plane will be referred to hereinafter as the "axle plane."

A shaft 148 (Figures 3 and 6) journalled in the ball-bearing 46 extends through the tubular half-axle 23 into the housing 22 to be driven by the axle transmission elements encased therein and its outer end carries the hub disk 149 of the wheel 24, to which both, the wheel disk 50 and a brake drum 51, are attached by bolts 52. A pair of brake shoes 53 and 54 is provided within the brake drum 51 being both formed with eyes pivotally mounted on the outer end of the pin 49. A fluid-actuated ram 55 (Figures 3 and 5) is interposed between the upper ends of the brake shoes 53 and 54 for the actuation thereof, and the brake shoes are connected by a traction spring 56. The brake drum is closed by a sheet metal member 57, which is fixed to the half-axle 23 and its arm 27, and has a peripheral flange overlying the periphery of the brake drum 51 and carries the ram 55.

On the other end of the pin 49 projecting inwardly from the head 48 there is mounted a rubber bushing 58 (Figure 6), provided with an outer sheet metal cylinder 59 preferably bonded thereto by a vulcanizing process. To the pin 49 an outer washer 60 bearing against the rubber cushion 58 without, however, contacting the sheet metal member 59, is attached by a threaded bolt 64 engaging internal threads of pin 49. A washer 61 is inserted between the rubber pad 58 and the head 48, but this washer too is spaced from the sheet metal cylinder 59. In this manner the transfer of vibration and noise from the pin 49 to the sheet metal cylinder 59 is limited to a minimum. The sheet metal cylinder 59 extends through co-axial openings provided in the side walls 62 of a channel member which constitutes the link 25, the member 59 being suitably secured to the side walls 62 by welding or otherwise. The other end of the pin 49 is formed with a flange 63 forming an abutment for the eye of the brake shoe 53.

The forward end of the link 25 is formed with an eye 65 (Figure 5) having a vertical axis and surrounding a stud formed by two adjoining cup-shaped sheet metal members 66 and 67 attached to one another by a threaded bolt and a nut 68. The member 66 is welded or otherwise connected to the bottom side of the associated beam 20. A ring shaped rubber pad 69 surrounds the studs 66, 68 and is embraced by the eye 65 and retained therein by upper and lower flanges thereof which are spaced from the sheet metal parts 66 and 67. In this manner the link 25 is pivotally connected to the vehicle body for universal relative rocking motion.

The helical spring 28 supports an element mounted on the vehicle body and is itself supported by the wheel guiding element constituted by the link 25. In the present embodiment of the invention, the element mounted on the vehicle body is an annular rubber cushion 70 (Figure 5) which is formed with a sleeve 71 closely surrounding a shock absorber 72 disposed co-axially within the helical spring 28. The top of the cushion 70 is provided with a sheet metal fixture 73 suitably fixed to the beam 20, while the lower portion of the periphery of the annular rubber cushion 70 is provided with a sheet metal ring 74 having a flange 75 which rests on the helical spring 28 and has a substantially plane seating face engaging the upper end of the spring. The elements 73 and 74 are suitably spaced, and the cushion 70 is so dimensioned as to be capable of transferring the weight of the body to the helical spring.

The wheel guiding element, which in the present embodiment is formed by the link 25, is provided with a helical seating face engaging the helical endwinding of the spring.

For that purpose I have equipped the link 25 with a substantially ring shaped sheet metal member generally designated by reference numeral 76 as shown in Figures 5 and 7. The cross-section of this sheet metal member comprises a basic horizontal leg portion 77, an adjoining upwardly slanting leg portion 78 and an adjoining upper horizontal leg portion 79 and a downwardly bent edge portion 80 (Figure 5). However, the seating face formed by the leg portion 77 does not extend within a single plane, but is helically shaped so as to conform to the lowermost winding of the spring 28. Between its lowest level and its highest level the annular sheet metal portion constituting the leg portion 77 is formed with a transitional step 180 against which the end of the lowermost spring winding may rest when the spring is angularly adjusted to its lowermost position. The spring, however, is rotatable about the shock absorber 72. Therefore, it may be so rotatably adjusted as to space its lower end from the step 180 and as to move its lowermost winding upwards on the helical seating face. Means are provided for optionally holding the spring in any one of a plurality of different angular positions of the seating face. For this purpose, the sheet metal member formed by the leg portion 77 may be provided with a plurality of holes 81. The end of the lowermost winding of the spring 28 is either turned downwardly or provided with a downwardly extending projection, which engages a selected one of the holes 81. The sheet metal member 76 rests on a conforming face of link 25 and may be welded thereto.

The cylindrical housing of the shock absorber 72 is provided with a downwardly extending stem 82 secured to the link 25 by means of two rubber bushings 83 and 84 which are held on pin 82 by a nut 85 and embrace between them a cup shaped sheet metal part 86 welded to the web of the link 25. The piston rod 87 (Figure 3) of the shock absorber extends through an aperture provided in beam 20 and into a sheet metal dome 88 welded thereto and has an eye 89 pivotally mounted on a pin 90 by means of an interposed rubber sleeve, the pin 90 being mounted in the walls of the dome 88. The sleeve-shaped portion 71 of the rubber cushion 70 seals the interior of the dome and thus protects the piston rod of the shock absorber from dirt and moisture.

The downward motion of the vehicle body relative to the wheel and the half-axle 23 is limited by a rubber buffer 91 inserted in a cup-shaped sheet metal fitting 92 attached to a sheet metal bracket 93 welded to the link 25 in front of the spring 28. The frame is formed with an abutting face 94 adapted to contact the buffer 91.

While I have described the suspension of the wheel shown in Fig. 3, it is to be understood that the other wheel is suspended by similar elements in the same fashion.

The function of my novel wheel suspension will now be explained with reference to the diagram in Fig. 2. In normal position, i.e. when the vehicle carries a normal load, the link 25 extends substantially horizontally holding the above defined axle plane including the arm 27 in vertical position. In this position the axle plane coincides with a vertical transverse plane which includes the axis of the annular member 32 and will be termed "normal plane" hereinafter. When the wheel rolling over an obstruction swings upwardly, the half-axle 23 is constrained by hinge 35 to move within the axle plane. However, since the pin 49 in the lower end of arm 27 is guided on an arc of a circle indicated at 95, the axle 23 will be slightly turned about its axis in clockwise direction with reference to Figures 2 and 5, rocking the housing 22 forwardly. As a result, the axle plane will be deflected out of coincidence with the normal plane, and both the center of the wheel and the pin 49 are displaced from the normal plane in the forward direction. However, the wheel center will be so displaced to a much lesser degree than the pin 49 in the lower end of arm 27. In Fig. 2 I have indicated the upper inclined position of arm 27 at 27' and the upper position of link 25 at 25'. The center of the wheel moves from 23 to 23'. Thus it will appear that the inclination of arm 27 shown in Fig. 2, which is rendered possible by the resilient attachment of housing 22 to the body of the vehicle, permits the center of the wheel to move on a curved path 96 which is much less curved than the arc 95 and will, therefore, result in a much smaller departure of half-axle 23 from the normal plane 3—3 of Fig. 2 than the departure of the pin 49 which moves to the point 49'. As any such departure causes the wheel to turn about a vertical axis, in a fashion similar to the steering effect of a front wheel, it is obvious that such departure should be limited to a minimum.

While I have described a preferred embodiment of my invention, I wish to be clearly understood that my invention is in no way limited to the details of such embodiment, but is capable of numerous modifications within the scope of the appended claims.

In Figs. 8 and 9 I have shown a modified connection between the spring 28 and the link 25. In this embodiment the lowermost winding of the spring 28 is armed with a sheet metal fixture in the form of a ring 97 which is similar to the sheet metal member 76 shown in Figs. 5 and 7. However, the ring is not provided with any holes, such as holes 81 of Figure 7, and, therefore, the end of the lowermost spring winding will permanently rest on the step corresponding to the step 180 of Figure 5. The ring 97 in its turn rests on a helical seating face 98 formed by a top plate 99 with which link 25 is provided. Therefore, the elevation of ring 97 can be varied by rotational adjustment. The ring 97 is held in its selected position by suitable means, such as two bolts 100, which are attached to the top plate 99 and engage internal recesses 101 of ring 97.

The details of the ring 97 are more clearly shown in Figures 10 through 13, it being understood that the ring 76 of Figures 5 and 7 is constructed in a similar manner. The seating surface for the spring, properly speaking, is formed by the helically-shaped rim portion 97a which terminates in an abrupt step 97b. The link 25 (Figure 8) is provided with a correspondingly shaped helical seating surface at the place of abutment or with an intermediate sheet metal plate member 99 having a corresponding configuration, however, in such a manner that a play 99a in the circumferential direction, as shown in Figure 11, enables a rotation of the spring seating ring member 97 by about 90° and therewith connection thereof, for example, by means of bolts 100, in the different rotary positions thereof by means of apertures designated by reference numerals 101. The apertures 101 may be either in the form of internal recesses or in the form of actual bores 81 as shown in Figure 7.

All of the rubber cushions interposed between the various components of my novel wheel suspension, such as the cushions 37, 41, 58, 70, 83, 84 and 91 may be bonded to the adjoining metal fixtures by a vulcanizing process in a known manner.

Prior to my invention, two different kinds of suspensions of half-axles were widely used. In one kind of suspension the half-axles are guided for rocking motion solely by the hinges connecting them to the axle transmission housing or other bracket member. All thrusts acting lengthwise and transversely on the wheel of the vehicle are transferred to such bracket member through the half-axle. In the second kind of suspension each half-axle is composed of two strut members mounted at an angle to one another, one strut member extending transversely of the vehicle and being carried by the axle transmission housing or other bracket member while the other strut member extends longitudinally of the vehicle and is pivotally connected to the body of the vehicle, for instance to a longitudinal beam thereof at a point located at the side of the vehicle. In this case, each half-axle oscillates about an axis extending through the points of connection of the two axle struts to the body or the transmission housing connected thereto, such axis extending at an acute angle to the vertical, longitudinal central plane of the vehicle. When the wheels move up and down, the axes are guided on conical faces. As a result, the wheels are constrained during such up and down motion to assume positions oblique to the direction of travel, thus producing an undesirable steering effect.

My novel suspension is far superior to such prior suspensions in that it results in an unobjectionable guidance of the wheels and in a favorable transfer of all forces from the wheels to the body whereby the wheel guiding elements are relieved from bending stresses to a considerable extent and may, therefore, be made very light and will nevertheless guarantee a reliable guidance of the wheels.

Moreover, the absence in my novel wheel suspension of diagonal axle struts used in prior systems involves the great advantage that the space required for such prior diagonal struts can be used for other purposes, for instance for accommodating the fuel tank, baggage compartments or for other purposes. Another advantage of my novel wheel suspension is the low location of the helical springs and the favorable accessibility of the springs, of the shock absorbers, and of the various elements requiring service.

The interposition of the rubber bushings or other rubber elements in the joints of the various components of the suspension will greatly minimize the transfer of noise and vibration from the wheels to the body of the vehicle. A reliable guidance of the half-axles does not require the use of very tough rubber compositions for such bushings but the latter may be made of soft rubber without jeopardizing the guidance of the wheels and without involving the risk of an oblique displacement of the axles since the lateral links 25 will securely keep the half-axles in transverse relationship to the vehicle body.

More particularly, the suspension constitutes a triangular system indicated in Fig. 1 by cross-hatching, such triangle being located in the plane of oscillation of the half-axle 23 which was termed the "axle plane" above. The corners of the triangle are the joints formed by the rubber bushings 58 and 37 surrounding the pins 49 and 36 (Figure 3). In Fig. 1 such joints are denoted by corresponding reference numerals 49 and 36. In the horizontal direction the triangle is rigidly held by the links 25. The joints 26 and 49 of such links constitute a substantially horizontal parallelogram which guides the triangular system 49, 36, 49 which is rigid in the horizontal plane for parallel motion and thereby prevents the axle system from assuming an oblique position upon transverse oscillations. The bracket member 22 may rock about the joint 36 to the right or to the left being supported in doing so by the rubber cushions 41 acting as springs which restore the bracket member 22 to its normal position and thus keep the axle system in its stable central position. When both wheels are raised equal amounts, i.e. when the two joints 49 are lifted together to the same extent, they move along the arc 95 of a circle about the joints 26, for instance into the position 49'. During such movement the axle system is retained at right angles to the direction of travel. When the two wheels move unequal amounts, for instance in such a manner that one of the two joints 49 arrives in the position 49' whereas the other joint 49 remains in its initial position, the center of the wheel will be lifted to the position indicated at 23'. It will appear that the departure of the point 23' from the plane 3—3 is considerably less than the departure of the joint 49' from the plane 3—3. Accordingly, the arc 96 described by the axle 23 has a much larger radius than the arc 95 described by pin or joint 49. Since the triangular axle system 49, 36, 49 is rigid in a horizontal plane it will rock about the straight line connecting joint 49 of the other half-axle with the joint 36 whereby the wheel will be steered out of its direction of travel to negligible extent only.

Another advantage of my novel suspension is the direct transfer of the forces acting on the brake shoes to the arms 27 and to the links 25 while the cover sheet metal plate of the brake drum is relieved from stresses.

My novel spring adjusting system involving the sheet metal washers having a helical seating face offers the advantage of a greatly facilitated adaptation of the springs which usually differ in length from the standard dimension and therefore require adjusting means for proper assembly. Prior to my invention exchangeable washers were used for that purpose.

What I claim is:

1. In a wheel suspension for a vehicle, the combination comprising an element mounted on the vehicle body, a helical spring engaging and supporting said element, a wheel guiding element supporting said helical spring, said spring being adjustable in a circumferential direction, one of the elements being provided with a substantially plane seating face engaging one end of said spring, the other element being provided with a helical seating face engaging the helical end-winding of said spring, and means for optionally holding said end-winding in any one of a plurality of different angular positions on said helical seating face.

2. The combination claimed in claim 1 in which said means for optionally holding said end-winding comprises a projection on said spring engaging one of a plurality of holes provided in said helical seating face.

3. In a wheel suspension for a vehicle, the combination comprising an element mounted on the vehicle body, a helical spring engaging and supporting said element, a wheel guiding element supporting said helical spring, means supported on said wheel guiding element and defining a helical seating face extending essentially transversely to the spring axis and axially engaging the helical end-winding of said spring thereon to enable adjustment of said helical end-winding in an axial direction by adjustment of said means relative to one of the two parts cooperating therewith in a circumferential direction.

4. The combination as claimed in claim 3, wherein said means forms a sheet metal fixture cooperating with said end-winding and provided with a plurality of recesses, and further comprising means including a stud fixed to said wheel guiding element and selectively engaging one of said recesses for optionally holding said end-winding in any one of a plurality of different angular positions on said seating face.

5. The combination claimed in claim 3 in which said first-mentioned element is a rubber-like cushion.

6. The combination claimed in claim 3 comprising in addition a telescopic shock absorber located within said helical spring and connected to said vehicle body and to said wheel guiding element, said first mentioned element comprising an annular rubber cushion formed with a sleeve closely surrounding said shock absorber.

7. In a wheel suspension for a vehicle, the combination comprising an element mounted on the vehicle body, a helical spring engaging and supporting said element, a wheel guiding element supporting said helical spring, means supported on said wheel guiding element and defining an annular plate-like helical seating face engaging the helical end-winding of said spring to enable adjustment of said helical end-winding in an axial direction thereof by adjustment of said means relative to one of the parts cooperating therewith in a circumferential direction, and means for optionally holding said end-winding in any one of a plurality of different angular positions on said seating face.

8. In a wheel suspension for a vehicle, the combination comprising an annular rubber cushion mounted on the vehicle body, a helical spring engaging and supporting said cushion, a wheel guiding element supporting said helical spring, a telescopic shock absorber located within said helical spring and connected to said vehicle body and to said wheel guiding element, said annular rubber cushion being of considerable height in the axial direction of said telescopic shock absorber and including a sleeve closely surrounding and abutting against said shock absorber to provide a sealing engagement therewith.

9. In a wheel suspension for a vehicle, the combination comprising an annular rubber cushion mounted on the vehicle body, a helical spring engaging and supporting said cushion, a wheel guiding element supporting said helical spring, a telescopic shock absorber located within said helical spring and connected to said vehicle body and to said wheel guiding element, said rubber cushion being of considerable volumetric dimension and having a height in the axial direction of said telescopic shock absorber of approximately the same magnitude as the width thereof so as to provide good noise absorption between the parts of said suspension and said vehicle body.

10. In a wheel suspension for a vehicle, the combination comprising an element mounted on the vehicle body, a helical spring engaging and supporting said element, a wheel guiding element supporting said helical spring, means supported on one of said two elements and defining a helical seating face extending essentially transversely to the spring axis and axially engaging the helical end winding of said spring thereon to enable adjustment of said helical end winding in an axial direction by adjustment of said means relative to one of the two parts cooperating therewith in a circumferential direction.

References Cited in the file of this patent

UNITED STATES PATENTS

| | | |
|---|---|---|
| 446,203 | Cochennour et al. | Feb. 10, 1891 |
| 1,595,317 | Scholey | Aug. 10, 1926 |
| 2,344,896 | Phelps | Mar. 21, 1944 |
| 2,375,670 | MacPherson | May 8, 1945 |
| 2,527,524 | Brent | Oct. 31, 1950 |
| 2,661,206 | Gregoire | Dec. 1, 1953 |